(12) United States Patent
Wagner et al.

(10) Patent No.: US 9,678,773 B1
(45) Date of Patent: Jun. 13, 2017

(54) LOW LATENCY COMPUTATIONAL CAPACITY PROVISIONING

(71) Applicant: Amazon Technologies, Inc., Seattle, WA (US)

(72) Inventors: Timothy Allen Wagner, Seattle, WA (US); Dylan Chandler Thomas, Seattle, WA (US); Sean Philip Reque, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 14/502,810

(22) Filed: Sep. 30, 2014

(51) Int. Cl.
G06F 9/455 (2006.01)
G06F 17/30 (2006.01)
G06F 9/445 (2006.01)

(52) U.S. Cl.
CPC .................. *G06F 9/45533* (2013.01)

(58) Field of Classification Search
CPC ............. G06F 9/45558; G06F 9/45533; G06F 9/5072; H04L 67/10; H04L 67/16
See application file for complete search history.

(56) References Cited

U.S. PATENT DOCUMENTS

| | | | |
|---|---|---|---|
| 5,283,888 A | 2/1994 | Dao et al. | |
| 6,708,276 B1 | 3/2004 | Yarsa et al. | |
| 7,665,090 B1 | 2/2010 | Tormasov et al. | |
| 7,707,579 B2 | 4/2010 | Rodriguez | |
| 7,823,186 B2 | 10/2010 | Pouliot | |
| 7,886,021 B2 * | 2/2011 | Scheifler | G06F 9/485 709/217 |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,065,676 B1 | 11/2011 | Sahai et al. | |
| 8,095,931 B1 | 1/2012 | Chen et al. | |
| 8,166,304 B2 | 4/2012 | Murase et al. | |
| 8,171,473 B2 | 5/2012 | Lavin | |

(Continued)

FOREIGN PATENT DOCUMENTS

| | | |
|---|---|---|
| WO | WO 2009/137567 A1 | 11/2009 |
| WO | WO 2016/053950 A1 | 4/2016 |

(Continued)

OTHER PUBLICATIONS

Czajkowski et al., Multitasking without compromise: a virtual machine evolution, Apr. 2012, 14 pages.*

(Continued)

*Primary Examiner* — Thuy Dao
(74) *Attorney, Agent, or Firm* — Knobbe, Martens, Olson & Bear, LLP

(57) ABSTRACT

A system for providing low latency computational capacity is provided. The system may be configured to maintain a pool of virtual machine instances, which may be assigned to users to service the requests associated with the users. The system may further be configured to receive a request to acquire compute capacity for executing a program code associated with a particular user, determine whether the pool of virtual machine instances includes a container that may be used to execute the program code therein, and cause the program code of the particular user to be executed in the container.

20 Claims, 5 Drawing Sheets

(56) References Cited

U.S. PATENT DOCUMENTS

| | | | |
|---|---|---|---|
| 8,336,079 B2* | 12/2012 | Budko | G06F 21/53 726/1 |
| 8,429,282 B1 | 4/2013 | Ahuja | |
| 8,448,165 B1 | 5/2013 | Conover | |
| 9,027,087 B2* | 5/2015 | Ishaya | H04L 63/08 726/4 |
| 9,146,764 B1 | 9/2015 | Wagner | |
| 9,208,007 B2* | 12/2015 | Harper | G06F 11/0709 |
| 9,323,556 B2 | 4/2016 | Wagner | |
| 2004/0249947 A1 | 12/2004 | Novaes et al. | |
| 2005/0132368 A1 | 6/2005 | Sexton et al. | |
| 2007/0094396 A1 | 4/2007 | Takano et al. | |
| 2007/0130341 A1 | 6/2007 | Ma | |
| 2008/0028409 A1 | 1/2008 | Cherkasova et al. | |
| 2008/0126486 A1 | 5/2008 | Heist | |
| 2008/0189468 A1 | 8/2008 | Schmidt et al. | |
| 2008/0201711 A1 | 8/2008 | Husain | |
| 2009/0055810 A1 | 2/2009 | Kondur | |
| 2009/0077569 A1 | 3/2009 | Appleton et al. | |
| 2009/0158275 A1 | 6/2009 | Wang et al. | |
| 2009/0198769 A1 | 8/2009 | Keller et al. | |
| 2009/0204964 A1 | 8/2009 | Foley et al. | |
| 2009/0300599 A1 | 12/2009 | Piotrowski | |
| 2010/0031274 A1 | 2/2010 | Sim-Tang | |
| 2010/0031325 A1 | 2/2010 | Maigne et al. | |
| 2010/0122343 A1 | 5/2010 | Ghosh | |
| 2010/0186011 A1 | 7/2010 | Magenheimer | |
| 2011/0029970 A1 | 2/2011 | Arasaratnam | |
| 2011/0055378 A1 | 3/2011 | Ferris et al. | |
| 2011/0055396 A1 | 3/2011 | DeHaan | |
| 2011/0099551 A1 | 4/2011 | Fahrig et al. | |
| 2011/0134761 A1 | 6/2011 | Smith | |
| 2011/0141124 A1 | 6/2011 | Halls et al. | |
| 2011/0153838 A1 | 6/2011 | Belkine et al. | |
| 2011/0184993 A1 | 7/2011 | Chawla et al. | |
| 2011/0265164 A1 | 10/2011 | Lucovsky | |
| 2012/0054744 A1 | 3/2012 | Singh et al. | |
| 2012/0072914 A1 | 3/2012 | Ota | |
| 2012/0110155 A1 | 5/2012 | Adlung et al. | |
| 2012/0110164 A1 | 5/2012 | Frey et al. | |
| 2012/0110588 A1 | 5/2012 | Bieswanger et al. | |
| 2012/0192184 A1 | 7/2012 | Burckart et al. | |
| 2012/0233464 A1 | 9/2012 | Miller et al. | |
| 2012/0331113 A1 | 12/2012 | Jain et al. | |
| 2013/0097601 A1 | 4/2013 | Podvratnik et al. | |
| 2013/0111469 A1 | 5/2013 | B et al. | |
| 2013/0151648 A1 | 6/2013 | Luna | |
| 2013/0179574 A1 | 7/2013 | Calder et al. | |
| 2013/0179894 A1 | 7/2013 | Calder et al. | |
| 2013/0185729 A1 | 7/2013 | Vasic et al. | |
| 2013/0191924 A1 | 7/2013 | Tedesco et al. | |
| 2013/0198319 A1 | 8/2013 | Shen et al. | |
| 2013/0227641 A1 | 8/2013 | White et al. | |
| 2013/0232480 A1 | 9/2013 | Winterfeldt et al. | |
| 2013/0297964 A1 | 11/2013 | Hegdal et al. | |
| 2013/0339950 A1 | 12/2013 | Ramarathinam et al. | |
| 2013/0346946 A1 | 12/2013 | Pinnix | |
| 2013/0346987 A1 | 12/2013 | Raney et al. | |
| 2014/0007097 A1 | 1/2014 | Chin et al. | |
| 2014/0019965 A1 | 1/2014 | Neuse et al. | |
| 2014/0019966 A1 | 1/2014 | Neuse et al. | |
| 2014/0040857 A1 | 2/2014 | Trinchini et al. | |
| 2014/0059226 A1* | 2/2014 | Messerli | G06F 9/5072 709/226 |
| 2014/0068611 A1 | 3/2014 | McGrath et al. | |
| 2014/0082165 A1 | 3/2014 | Marr et al. | |
| 2014/0101649 A1 | 4/2014 | Kamble et al. | |
| 2014/0109087 A1 | 4/2014 | Jujare et al. | |
| 2014/0130040 A1 | 5/2014 | Lemanski | |
| 2014/0173616 A1 | 6/2014 | Bird et al. | |
| 2014/0180862 A1* | 6/2014 | Certain | G06Q 30/00 705/26.3 |
| 2014/0215073 A1 | 7/2014 | Dow et al. | |
| 2014/0245297 A1 | 8/2014 | Hackett | |
| 2014/0279581 A1 | 9/2014 | Devereaux | |
| 2014/0282615 A1 | 9/2014 | Cavage et al. | |
| 2014/0289286 A1* | 9/2014 | Gusak | G06F 17/30348 707/813 |
| 2014/0304698 A1 | 10/2014 | Chigurapati et al. | |
| 2015/0120928 A1* | 4/2015 | Gummaraju | H04L 67/1008 709/226 |
| 2016/0072727 A1* | 3/2016 | Leafe | H04L 47/781 709/226 |
| 2016/0092250 A1 | 3/2016 | Wagner et al. | |
| 2016/0092252 A1 | 3/2016 | Wagner | |
| 2016/0098285 A1 | 4/2016 | Davis et al. | |
| 2016/0164762 A1 | 6/2016 | Reque et al. | |
| 2016/0164797 A1 | 6/2016 | Reque et al. | |

FOREIGN PATENT DOCUMENTS

| | | |
|---|---|---|
| WO | WO 2016/053968 A1 | 4/2016 |
| WO | WO 2016/053973 A1 | 4/2016 |
| WO | WO 2016/090292 | 6/2016 |

OTHER PUBLICATIONS

Qian et al., Estimating optimal cost of allocating virtualized resources with dynamic demand, Sep. 2011, 2 pages.*
Dombrowski et al., Dynamic monitor allocation in the Java virtual machine, Oct. 2013, 8 pages.*
Anonymous: "Adapter pattern—Wikipedia, the free encyclopedia", Apr. 4, 2015 (Apr. 4, 2015), XP055275559, Retrieved from the Internet: URL:https://en.wikipedia.org/w/index.php?title=Adapter_pattern&oldid=654971255 [retrieved on May 26, 2016] the whole document.
Anonymous: "Shim (computing)—Wikipedia, the free encyclopedia", Apr. 4, 2015, XP055275558, Retrieved from the Internet: URL:https://en.wikipedia.org/w/index.php?title=Shim_(computing)&oldid=654971528 [retrieved on May 26, 2016] the whole document.
Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.
Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.
International Search Report and Written Opinion in PCT/US2015/052810dated Dec. 17, 2015, 18 pages.
International Search Report and Written Opinion in PCT/US2015/052838 dated Dec. 18, 2015, 23 pages.
International Search Report and Written Opinion in PCT/US2015/052833dated Jan. 13, 2016, 17 pages.
International Search Report and Written Opinion in PCT/US2015/064071dated Mar. 16, 2016, 17 pages.
International Search Report and Written Opinion in PCT/US2016/016211dated Apr. 13, 2016 11 pages.
International Search Report and Written Opinion in PCT/US2016/026514 dated Jun. 8, 2016, 20 pages.

* cited by examiner

500

| LATENCY PERFORMANCE | | USER CODE LOCATION | | |
|---|---|---|---|---|
| | | CONTAINER | INSTANCE | EXTERNAL SERVICE |
| INSTANCE LOCATION | ACTIVE POOL | BEST CASE | | |
| | WARMING POOL | | ⟷ | |
| | CREATION NEEDED | | | WORST CASE |

FIG. 5

LOW LATENCY COMPUTATIONAL CAPACITY PROVISIONING

CROSS-REFERENCE TO CONCURRENTLY-FILED APPLICATIONS

The present application's Applicant is concurrently filing the following U.S. patent applications on Sep. 30, 2014:
Ser. No. 14/502,589 MESSAGE-BASED COMPUTATION REQUEST SCHEDULING
Ser. No. 14/502,714 AUTOMATIC MANAGEMENT OF LOW LATENCY COMPUTATIONAL CAPACITY
Ser. No. 14/502,992 THREADING AS A SERVICE
Ser. No. 14/502,648 PROGRAMMATIC EVENT DETECTION AND MESSAGE GENERATION FOR REQUESTS TO EXECUTE PROGRAM CODE
Ser. No. 14/502,741 PROCESSING EVENT MESSAGES FOR USER REQUESTS TO EXECUTE PROGRAM CODE
Ser. No. 14/502,620 DYNAMIC CODE DEPLOYMENT AND VERSIONING The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 5 illustrates an example table illustrating the various scenarios encountered by a virtual compute system manager.

DETAILED DESCRIPTION

Figure 1:
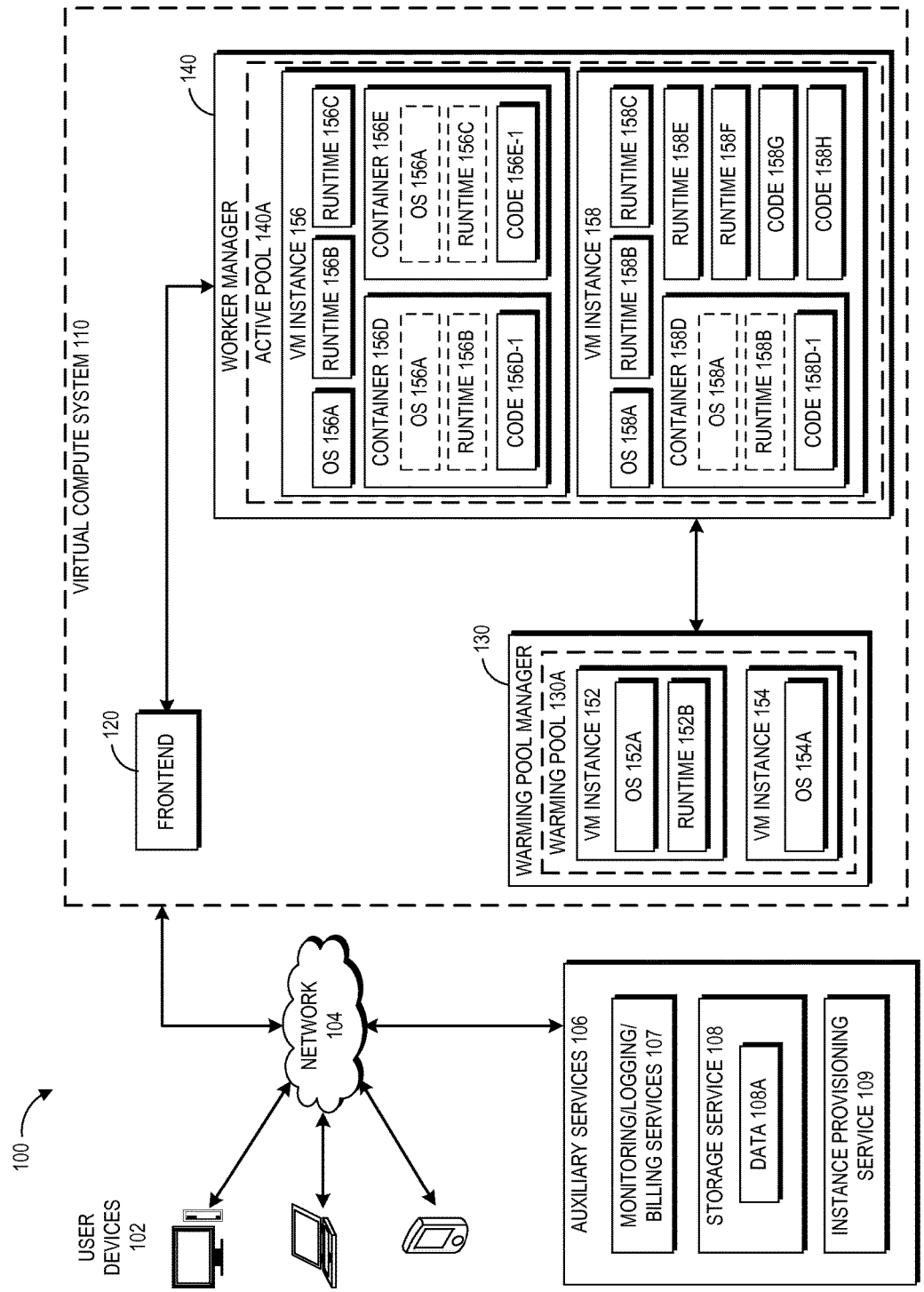
FIG. 1 is a block diagram depicting an illustrative environment for acquiring low latency compute capacity.

Companies and organizations no longer need to acquire and manage their own data centers in order to perform computing operations (e.g., execute code, including threads, programs, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, delay (sometimes referred to as latency) associated with executing the user code (e.g., instance and language runtime startup time) can be significantly reduced.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may maintain a pool of virtual machine instances on one or more physical computing devices, where each virtual machine instance has one or more software components loaded thereon. When the virtual compute system receives a request to execute the program code of a user, which specifies one or more computing constraints for executing the program code of the user, the virtual compute system may select a virtual machine instance for executing the program code of the user based on the one or more computing constraints specified by the request and cause the program code of the user to be executed on the selected virtual machine instance.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the virtual compute system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated virtual compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the virtual compute system 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail below with reference to FIG. 4.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail below with reference to FIG. 2.

Figure 2:
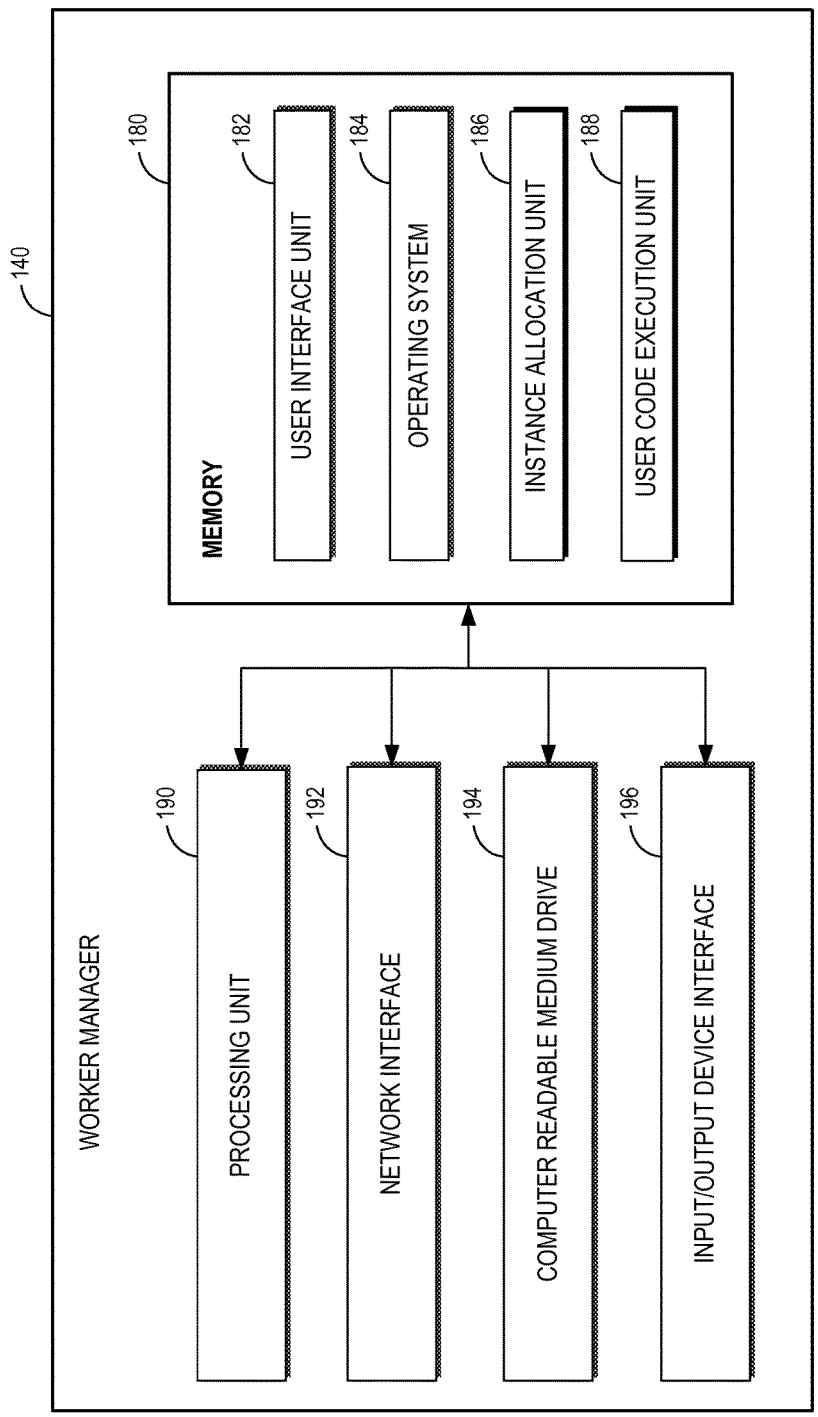
FIG. 2 depicts a general architecture of a computing device providing a virtual compute system manager for acquiring low latency compute capacity.

FIG. 2 depicts a general architecture of a computing system (referenced as worker manager 140) that manages the virtual machine instances in the virtual compute system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
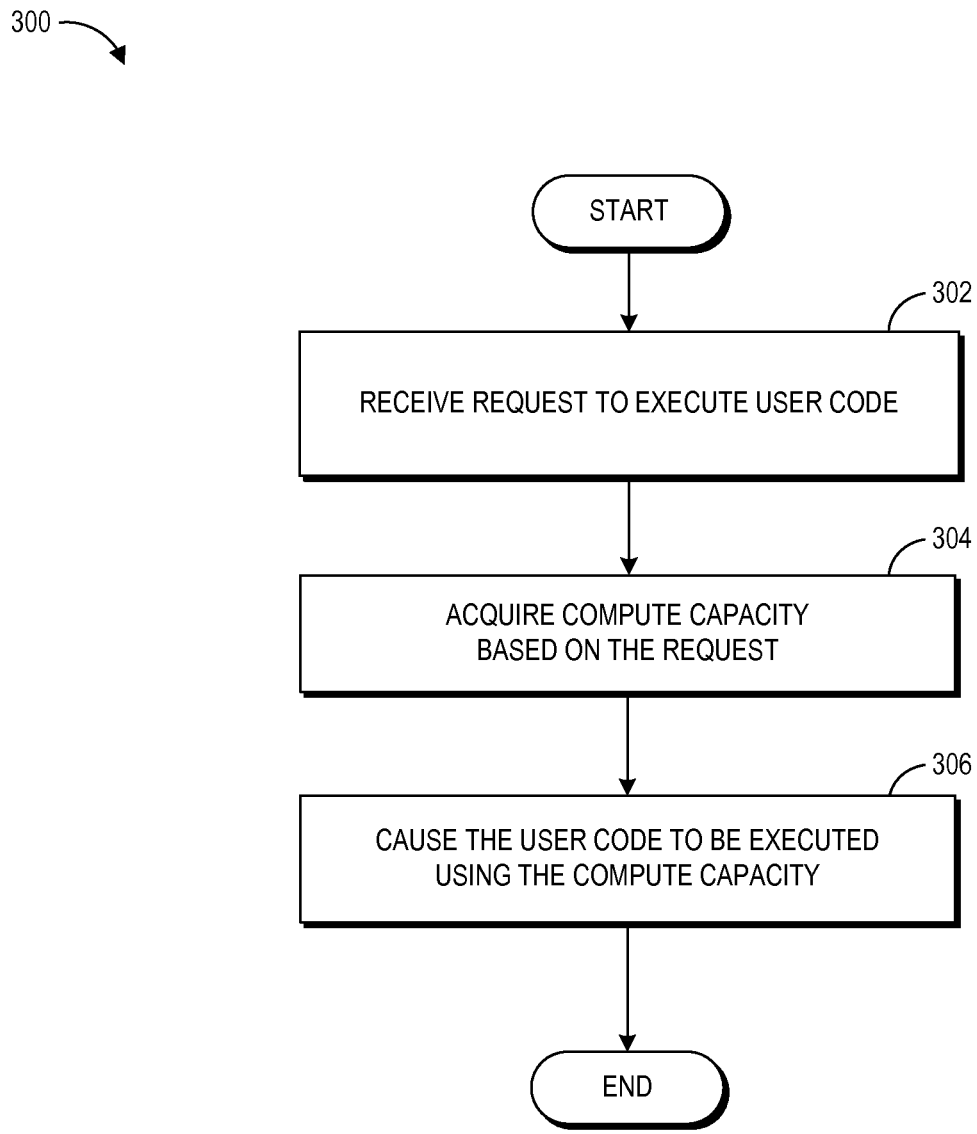
FIG. 3 is a flow diagram illustrating a low latency compute capacity acquisition routine implemented by a worker manager, according to an example aspect.

Turning now to FIG. 3, a routine 300 implemented by one or more components of the virtual compute system 110 (e.g., the worker manager 140) will be described. Although routine 300 is described with regard to implementation by the worker manager 140, one skilled in the relevant art will appreciate that alternative components may implement routine 300 or that one or more of the blocks may be implemented by a different component or in a distributed manner.

At block 302 of the illustrative routine 300, the worker manager 140 receives a request to execute user code. Alternatively, the worker manager 140 receives a request from the frontend 120 of FIG. 1 to find compute capacity for executing the user code associated with an incoming request received and processed by the frontend 120. For example, the frontend 120 may process the request received from the user computing devices 102 or the auxiliary services 106, and forward the request to the worker manager 140 after authenticating the user and determining that the user is authorized to access the specified user code. As discussed above, the request may include data or metadata that indicates the program code to be executed, the language in which the program code is written, the user associated with the request, and/or the computing resources (e.g., memory, etc.) to be reserved for executing the program code. For example, the request may specify that the user code is to be executed on "Operating System A" using "Language Runtime X." In such an example, the worker manager 140 may locate a virtual machine instance that has been pre-configured with "Operating System A" and "Language Runtime X" and assigned it to the user. The worker manager 140 may then create a container on the virtual machine instance for executing the user code therein.

Next, at block 304, the worker manager 140 acquires compute capacity based on the information indicated in the request. In some embodiments, the compute capacity comprises a container that is configured to service the code execution request. As discussed herein, the container may be acquired from the active pool 140A or the warming pool 130A. How the compute capacity is acquired is described in greater detail below with reference to FIG. 4.

At block 306, the worker manager 140 causes the user code to be executed using the compute capacity. For example, the worker manager 140 may send the address of the container assigned to the request to the frontend 120 so that the frontend 120 can proxy the code execution request to the address. In some embodiments, the address may be temporarily reserved by the worker manager 140 and the address and/or the container may automatically be released after a specified time period elapses. In some embodiments, the address and/or the container may automatically be released after the user code has finished executing in the container.

While the routine 300 of FIG. 3 has been described above with reference to blocks 302-306, the embodiments described herein are not limited as such, and one or more blocks may be omitted, modified, or switched without departing from the spirit of the present disclosure. For example, the block 302 may be modified such that the worker manager 140 receives a compute capacity acquisition request from the frontend 120.

Figure 4:
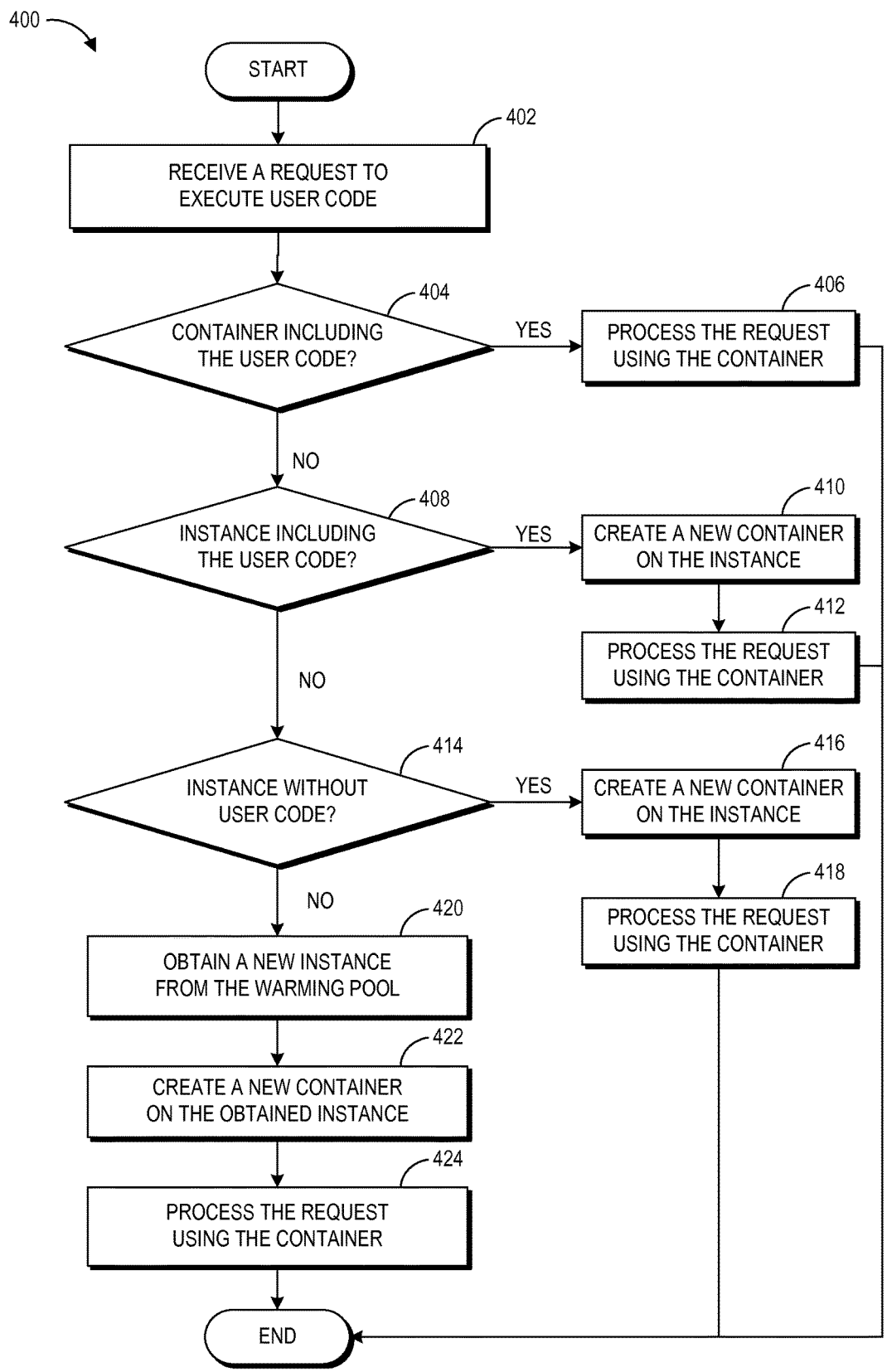
FIG. 4 is a flow diagram illustrating a low latency compute capacity acquisition routine implemented by a worker manager, according to another example aspect.

Turning now to FIG. 4, a routine 400 implemented by one or more components of the virtual compute system 110 (e.g., the worker manager 140) will be described. Although routine 400 is described with regard to implementation by the worker manager 140, one skilled in the relevant art will appreciate that alternative components may implement routine 400 or that one or more of the blocks may be implemented by a different component or in a distributed manner.

At block 402 of the illustrative routine 400, the worker manager 140 receives a request to execute user code. For example, the block 402 may be similar to the block 302 of FIG. 3.

Next, at block 404, the worker manager 140 determines whether there exists a container in the virtual compute system 110 that already has the user code associated with request loaded therein. In one embodiment, the worker manager 140 first determines whether the active pool 140A has any instances assigned to the user associated with the request, and look in any of those instances whether there is a container with the user code loaded therein. In another embodiment, the worker manager 140 checks a list that includes all the instances in the active pool 140A and searches the list for a code ID associated with or assigned to the user code. The code ID may be automatically generated based on the request or a portion thereof (e.g., based on the code location or the actual code). If the worker manager 140 determines that there is a container with the user code loaded therein, the routine 400 proceeds to block 406, where the worker manager 140 processes the request using the identified container. On the other hand, if the worker manager 140 determines that there is no container with the user coded loaded therein, the routine 400 proceeds to block 408.

The illustrative routine 400 describes temporal sharing of the containers, where the worker manager 140 may maintain a particular container after completing a previous request to execute a program code on that particular container and send a subsequent request associated with the same program code back to the same container. In another embodiment, the worker manager 140 may acquire and provide low latency compute capacity by utilizing spatial sharing. With spatial sharing, multiple temporally-overlapping requests are sent to the same container, e.g., forcing the container to use multiple threads to handle the multiple requests. For example, the worker manager 140 may find that a container is busy running a particular program code and further engage the same container to do more of the same work (e.g., execute the particular program code).

Retuning to FIG. 4, at block 408, the worker manager 140 determines whether there exists an instance in the virtual compute system 110 that has the user code stored thereon. For example, one of the instances may have previously executed the user code in a container created thereon, and the container may since have been terminated, but the user code may still remain on the instance (e.g., in an instance code cache). If the worker manager 140 determines that there is such an instance, the routine 400 proceeds to block 410, where the worker manager 140 creates a new container on the instance, and block 412, wherein the worker manager 140 causes the request to be processed using the container. Before the new container is created, the worker manager 140 may determine whether the instance has resources sufficient to handle the request. On the other hand, if the worker manager 140 determines that there is no such instance, the routine 400 proceeds to block 414.

At block 414, the worker manager 140 determines whether there exists an instance in the virtual compute system 110 that is currently assigned to the user associated with the request. In some embodiments, such a determination may have already been made (e.g., at block 404 and/or block 408). If the worker manager 140 determines that there is such an instance, the routine 400 proceeds to block 416, where the worker manager 140 creates a new container on the instance, and block 418, wherein the worker manager 140 causes the request to be processed using the container. Before the new container is created, the worker manager 140 may determine whether the instance has resources sufficient to handle the request. On the other hand, if the worker manager 140 determines that there is no such instance, the routine 400 proceeds to block 420.

At block 420, the worker manager 140 obtains a new instance from the warming pool 130A or from the warming pool manager 130. At block 422, the worker manager 140 creates a new container on the obtained instance. At block 424, the worker manager 140 processes the request using the container. For example, the worker manager 140 assigns the container to the request, and sends the address of the container to the frontend 120.

While the routine 400 of FIG. 4 has been described above with reference to blocks 402-410, the embodiments described herein are not limited as such, and one or more blocks may be omitted, modified, or switched without departing from the spirit of the present disclosure. For example, the block 402 may be modified such that the worker manager 140 receives a compute capacity acquisition request from the frontend 120. In another embodiment, the worker manager 140 may first determine whether there exists an instance assigned to the user, and if it determines that there is no such instance, the routine 400 may proceed directly to block 420. In another embodiment, instead of creating a new container at blocks 410 and 416, the worker manager 140 may configure an existing container on the instance assigned to the user and use the container to process the request.

Turning now to FIG. 5, a table 500 that illustrates various possible scenarios encountered by the worker manager 140 and how latency performance may be affected by instance and user code locations will be described. The table 500 shows the various locations that the user code associated with a request and the instance for servicing the request may be found after the request is received. In the example of FIG. 5, the user code may be found in a container (e.g., on a currently-running or recently used instance in the active pool 140A assigned to the user associated with the request), an instance (e.g., an instance in the active pool 140A, but not on a container within such instance), or an external service (e.g., code storage service such as the storage system 108), in the order of increasing latency (associated with executing the user code). Similarly, the instance for servicing the request may be found in an active pool (e.g., the active pool 140A), a warming pool (e.g., the warming pool 130A), or in neither, in which case a new instance would be created to handle the incoming request), in the order of increasing latency (associated with executing the user code). Depending on the implementation of the virtual compute system 110, one or more of the scenarios illustrated in FIG. 5 may not be feasible or possible. For example, in some implementations, if the user code is found in one of the containers, the instance for servicing the request is simply the instance in which the container is created, rendering the warming pool and the external service scenarios moot.

The locations referred to herein may be logical in nature, and may or may not correspond to physically distinct locations. Additionally, the locations illustrated in FIG. 5 are mere examples, and the embodiments described herein may involve fewer or more locations of user codes and/or instances.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
maintaining an active pool of virtual machine instances assigned to one or more users, wherein each virtual machine instance in the active pool has one or more software components loaded thereon;
receiving a request to acquire compute capacity for executing a program code of a user on the virtual compute system, the request including metadata indicating the program code, the user associated with the program code, and a first amount of computing resources to be allocated for executing the program code on the virtual compute system;
determining whether the active pool contains a container that has the program code loaded thereon;
in response to determining that the active pool does not contain a container that has the program code loaded thereon, determining whether the active pool contains a virtual machine instance that is assigned to the user and has at least the first amount of computing resources available for executing the program code;
in response to determining that the active pool contains a virtual machine instance that is assigned to the user and has at least the first amount of computing resources available for executing the program code, creating a container having at least the first amount of computing resources on the virtual machine instance and assigning the container to handle the request to execute the program code on the virtual compute system; and
causing the program code of the user to be executed in the container created on the virtual machine instance.

2. The computer-implemented method of claim 1, further comprising:
causing the program code of the user to be downloaded onto the container from a storage system logically associated with the virtual machine instance.

3. The computer-implemented method of claim 1, further comprising:
causing the program code of the user to be downloaded onto the virtual machine instance from a web-based data store in network communication with the virtual compute system.

4. The computer-implemented method of claim 1, further comprising maintaining a warming pool of virtual machine instances, wherein the warming pool comprises at least one virtual machine instance that is configured to satisfy at least one of a predetermined plurality of computing constraints specified in the request.

5. A system for providing low-latency computational capacity, the system comprising:
an electronic data store configured to store one or more program codes associated with one or more users; and
a virtual compute system comprising one or more hardware computing devices executing specific computer-executable instructions, said virtual compute system in communication with the data store, and configured to at least:
maintain a plurality of virtual machine instances on one or more physical computing devices, the plurality of virtual machine instances comprising (i) a warming pool comprising unassigned virtual machine instances having one or more software components loaded thereon waiting to be assigned to a user, and (ii) an active pool comprising virtual machine instances assigned to one or more users;
receive a request to execute a program code associated with a particular user of the virtual compute system, the request including metadata indicating information regarding the program code, the particular user associated with the program code, and a first amount of computing resources to be allocated for executing the program code on the virtual compute system;
determine whether the active pool contains a container that has the program code loaded thereon;
in response to determining that the active pool does not contain a container that has the program code loaded thereon, determine whether the active pool contains a virtual machine instance that has the program code stored thereon;
in response to determining that the active pool does not contain a virtual machine instance that has the program code stored thereon, determine whether the active pool contains a virtual machine instance that is assigned to the particular user and has at least the first amount of computing resources available to handle the request;
in response to determining that the active pool does not contain a virtual machine instance that is assigned to the particular user and has at least the first amount of computing resources available to handle the request, select a virtual machine instance from the warming pool;
create a container having at least the first amount of computing resources on the selected virtual machine instance and assign the container to handle the request to execute the program code on the virtual compute system; and
cause the program code associated with the particular user to be loaded and executed in the container.

6. The system of claim 5, wherein the virtual compute system is configured to download the program code associated with the particular user onto the container from the electronic data store.

7. A system, comprising:
a virtual compute system comprising one or more hardware computing devices executing specific computer-executable instructions and configured to at least:
maintain an active pool of virtual machine instances assigned to one or more users, wherein each virtual machine instance in the active pool has one or more software components loaded thereon;
receive a request to acquire compute capacity for executing a program code of a user on the virtual compute system, the request including metadata indicating the program code, the user associated with the program code, and a first amount of computing resources to be allocated for executing the program code on the virtual compute system;

determine whether the active pool contains a container that has the program code loaded thereon;

in response to determining that the active pool does not contain a container that has the program code loaded thereon, determine whether the active pool contains a virtual machine instance that is assigned to the user and has at least the first amount of computing resources available for executing the program code;

in response to determining that the active pool contains a virtual machine instance that is assigned to the user and has at least the first amount of computing resources available for executing the program code, create a container having at least the first amount of computing resources on the virtual machine instance and assign the container to handle the request to execute the program code on the virtual compute system; and cause the program code of the user to be executed in the container created on the virtual machine instance.

8. The system of claim 7, wherein the virtual compute system is further configured to cause the program code of the user to be downloaded onto the container from a storage system logically associated with the virtual machine instance.

9. The system of claim 7, further comprising a web-based data store in communication with the virtual compute system and configured to store at least the program code of the user, wherein the virtual compute system is further configured to cause the program code of the user to be downloaded onto the container from the web-based data store.

10. The system of claim 7, wherein the request specifies at least one of a predetermined plurality of computing constraints for executing the program code, and wherein the virtual compute system is further configured to maintain a warming pool of virtual machine instances, wherein the warming pool comprises at least one virtual machine instance that is configured to satisfy the at least one of the predetermined plurality of computing constraints specified in the request.

11. The system of claim 7, further comprising an internal code cache configured to store program codes executed on the virtual compute system, wherein the virtual compute system is further configured to store the program code of the user in the internal code cache upon causing the program code of the user to be loaded on the container.

12. The system of claim 7, wherein the request specifies an execution behavior for executing the program code on the virtual compute system, and wherein the virtual compute system is further configured to configure the container based on the execution behavior specified by the request.

13. A computer-readable, non-transitory storage medium storing computer executable instructions that, when executed by one or more computing devices, configure the one or more computing devices to perform operations comprising:

maintaining an active pool of virtual machine instances assigned to one or more users, wherein each virtual machine instance in the active pool has one or more software components loaded thereon;

receiving a request to acquire compute capacity for executing a program code of a user on the virtual compute system, the request including metadata indicating the program code, the user associated with the program code, and a first amount of computing resources to be allocated for executing the program code on the virtual compute system;

determining whether the active pool contains a container that has the program code loaded thereon;

in response to determining that the active pool does not contain a container that has the program code loaded thereon, determining whether the active pool contains a virtual machine instance that is assigned to the user and has at least the first amount of computing resources available for executing the program code;

in response to determining that the active pool contains a virtual machine instance that is assigned to the user and has at least the first amount of computing resources available for executing the program code, creating a container having at least the first amount of computing resources on the virtual machine instance and assigning the container to handle the request to execute the program code on the virtual compute system; and causing the program code of the user to be executed in the container on the virtual machine instance.

14. The computer-readable, non-transitory storage medium of claim 13, wherein the operations further comprise causing the program code of the user to be downloaded onto the container from a storage system logically associated with the virtual machine instance.

15. The computer-readable, non-transitory storage medium of claim 13, wherein the operations further comprise causing the program code of the user to be downloaded onto the container from a web-based data store in network communication with the virtual compute system.

16. The computer-readable, non-transitory storage medium of claim 13, wherein operations further comprise maintaining a warming pool of virtual machine instances, wherein the warming pool comprises at least one virtual machine instance that is configured to satisfy at least one of a predetermined plurality of computing constraints specified in the request.

17. A system, comprising:

a virtual compute system comprising one or more hardware computing devices executing specific computer-executable instructions and configured to at least:

maintain an active pool of virtual machine instances currently assigned to one or more users, wherein each virtual machine instance in the active pool has one or more software components loaded thereon;

receive a request to acquire compute capacity for executing a program code of a user on the virtual compute system, the request including metadata indicating the program code, the user associated with the program code, and a first amount of computing resources to be allocated for executing the program code on the virtual compute system;

acquire a container having at least the first amount of computing resources, based on an execution priority, for executing the program code of the user, the container created on one of the virtual machine instances in the active pool; and cause the program code of the user to be executed in the container created on the virtual machine instance.

18. The system of claim 17, wherein the execution priority causes the virtual compute system to determine that there is no container that already has the program code loaded therein at the time the request is received before determining whether the container should be created on a virtual machine instance already assigned to the user at the time the request is received.

19. The system of claim 17, wherein the execution priority causes the virtual compute system to determine that there is no virtual machine instance already assigned to the user at the time the request is received and having at least the first amount of computing resources before determining whether the container should be created on a virtual machine instance not yet created or assigned to the user at the time the request is received.

20. The system of claim 17, wherein the request specifies at least one of a predetermined plurality of computing constraints for executing the program code, and wherein the virtual compute system is further configured to maintain a warming pool of virtual machine instances, wherein the warming pool comprises at least one virtual machine instance that is configured to satisfy the at least one of the predetermined plurality of computing constraints specified in the request.

* * * * *